US 6,691,632 B2

(12) United States Patent
Stevens

(10) Patent No.: US 6,691,632 B2
(45) Date of Patent: Feb. 17, 2004

(54) SAILING CRAFT STABLE WHEN AIRBORNE

(76) Inventor: Mac Stevens, 1885 Foxworthy Ave., San Jose, CA (US) 95124-1619

( * ) Notice: Subject to any disclaimer, the term of this patent is extended or adjusted under 35 U.S.C. 154(b) by 0 days.

(21) Appl. No.: 10/002,889

(22) Filed: Dec. 5, 2001

(65) Prior Publication Data

US 2003/0101919 A1 Jun. 5, 2003

(51) Int. Cl.[7] .............................................. B63B 35/00
(52) U.S. Cl. ................................... 114/39.31; 114/272
(58) Field of Search ................................ 114/271, 272, 114/273, 39.26, 39.27, 39.29, 39.31; D12/303, 309, 337; 244/104, 105, 106, 50; 440/37; 180/116, 117

(56) References Cited

U.S. PATENT DOCUMENTS

| 57,996 | A | | 9/1866 | Sykes |
| 612,209 | A | | 10/1898 | Ljungstrom |
| 647,703 | A | | 4/1900 | Pool |
| 1,336,226 | A | | 4/1920 | Hart |
| 1,356,300 | A | | 10/1920 | Mcintyre |
| 2,502,522 | A | * | 4/1950 | Hoobler ........................ 244/50 |
| 2,804,038 | A | | 8/1957 | Barkla |
| D204,035 | S | * | 3/1966 | Scherer ...................... D12/304 |
| 3,295,487 | A | | 1/1967 | Smith |
| D212,786 | S | * | 11/1968 | Scherer ...................... D12/304 |
| 3,425,383 | A | | 2/1969 | Scherer |
| 3,455,261 | A | | 7/1969 | Perrin |
| 3,532,067 | A | | 10/1970 | Baker |
| 3,631,828 | A | | 1/1972 | Smith |
| D230,643 | S | * | 3/1974 | Garrad et al. ................. D10/80 |
| 3,800,724 | A | | 4/1974 | Tracy |
| 3,804,428 | A | | 4/1974 | Amick |
| 3,899,146 | A | | 8/1975 | Amick |
| 3,966,143 | A | | 6/1976 | Smith |
| 3,987,982 | A | | 10/1976 | Amick |
| 4,080,922 | A | * | 3/1978 | Brubaker .................... 114/282 |
| 4,117,900 | A | | 10/1978 | Amick |
| 4,164,909 | A | | 8/1979 | Ballard |
| 4,228,750 | A | | 10/1980 | Smith et al. |
| 4,450,784 | A | | 5/1984 | Mellinger |
| 4,458,859 | A | | 7/1984 | Ganev |
| 4,592,298 | A | | 6/1986 | Finot |
| 4,635,577 | A | | 1/1987 | Palmquist |
| 4,674,427 | A | | 6/1987 | Finot |
| 4,685,641 | A | * | 8/1987 | Kirsch et al. ................. 114/272 |
| D304,924 | S | * | 12/1989 | Rosenthal ................... D12/331 |
| 4,934,296 | A | | 6/1990 | Smith et al. |
| D324,021 | S | * | 2/1992 | Walker ....................... D12/304 |
| 5,168,824 | A | | 12/1992 | Ketterman |
| 5,181,674 | A | | 1/1993 | Apgar |
| D337,300 | S | | 7/1993 | Bielefeldt |
| D345,542 | S | | 3/1994 | Duncan |
| 5,435,259 | A | | 7/1995 | Labrador |
| 5,471,942 | A | | 12/1995 | Miller et al. |
| 5,474,011 | A | | 12/1995 | Steinberg |
| 5,727,495 | A | * | 3/1998 | Reslein ....................... 114/272 |
| 6,016,759 | A | | 1/2000 | Russell |

OTHER PUBLICATIONS

Sailing World Magazine, p. 633, Jun. 1989.
Design News Magazine, Mar. 26, 1990.
Sailing World, Sep. 1990.
Sailing World, Apr. 1993.
Sailing World, Jun. 1993.

* cited by examiner

Primary Examiner—S. Joseph Morano
Assistant Examiner—Andrew Wright

(57) ABSTRACT

A wind propelled vehicle comprising: (a) an assembly of airfoils fixedly joined; (b) all-moveable rudder and horizontal stabilizer, or suitable substitute, for aerodynamic yaw and pitch control; and (c) pontoons and hydrofoils, skis, skates, runners or wheels. The vehicle is wind-propelled by controlling the angle of the relative wind to produce a sideways lift force on the airfoil assembly and controlling the angle of the pontoons, etc. to use that force to cause forward motion. Airborne operation is achieved by changing the angle of the relative wind to produce an upward lift force on the airfoil assembly. Water rudder is absent. Orientation is always controlled aerodynamically.

15 Claims, 11 Drawing Sheets

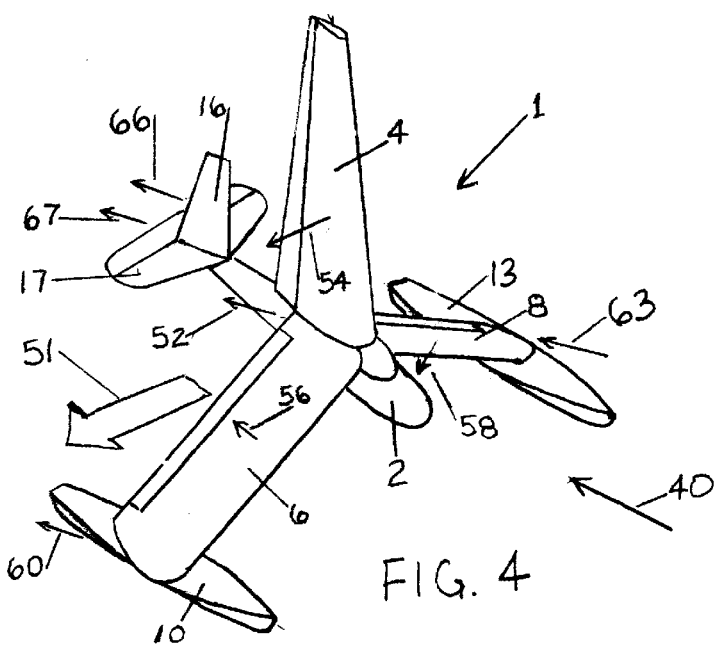
FIG. 4
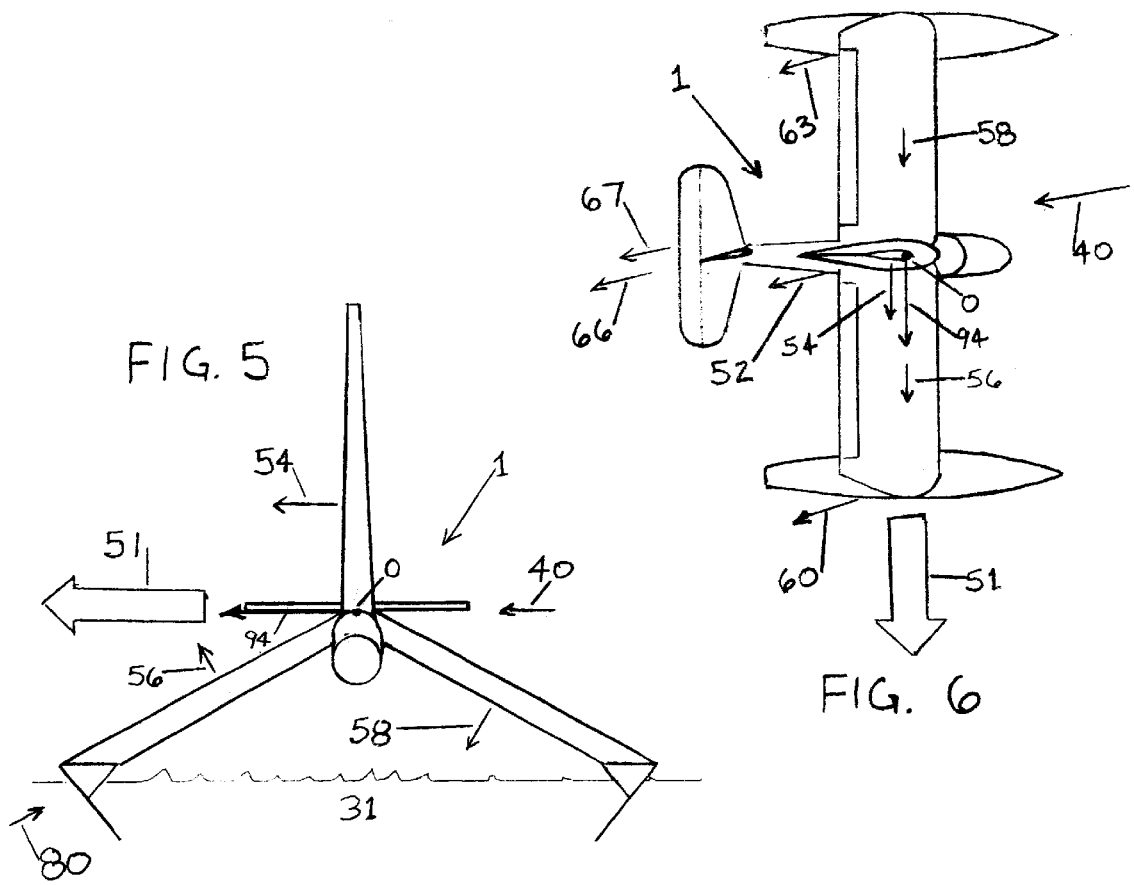
FIG. 5
FIG. 6

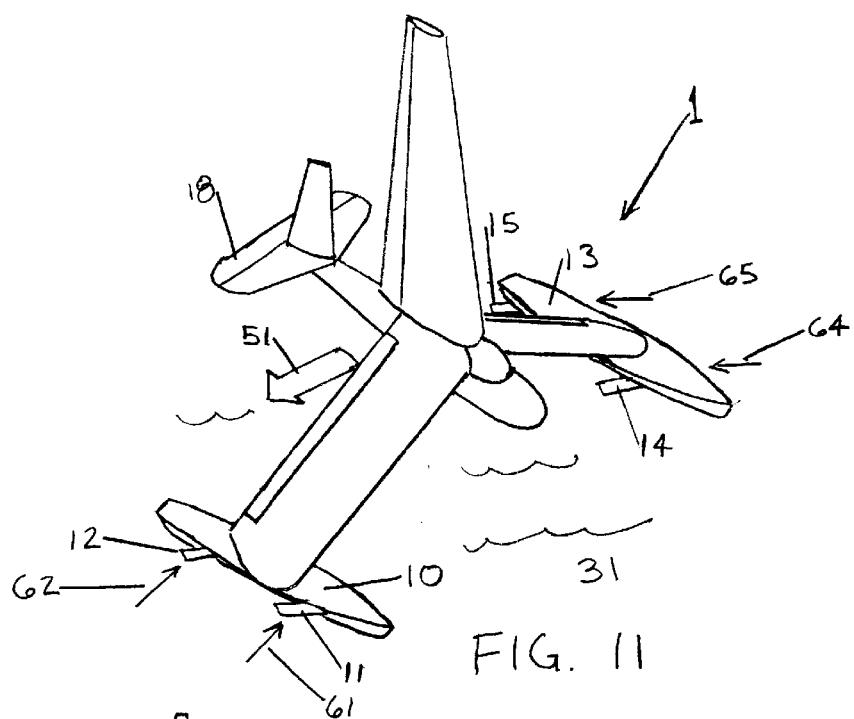
FIG. 11
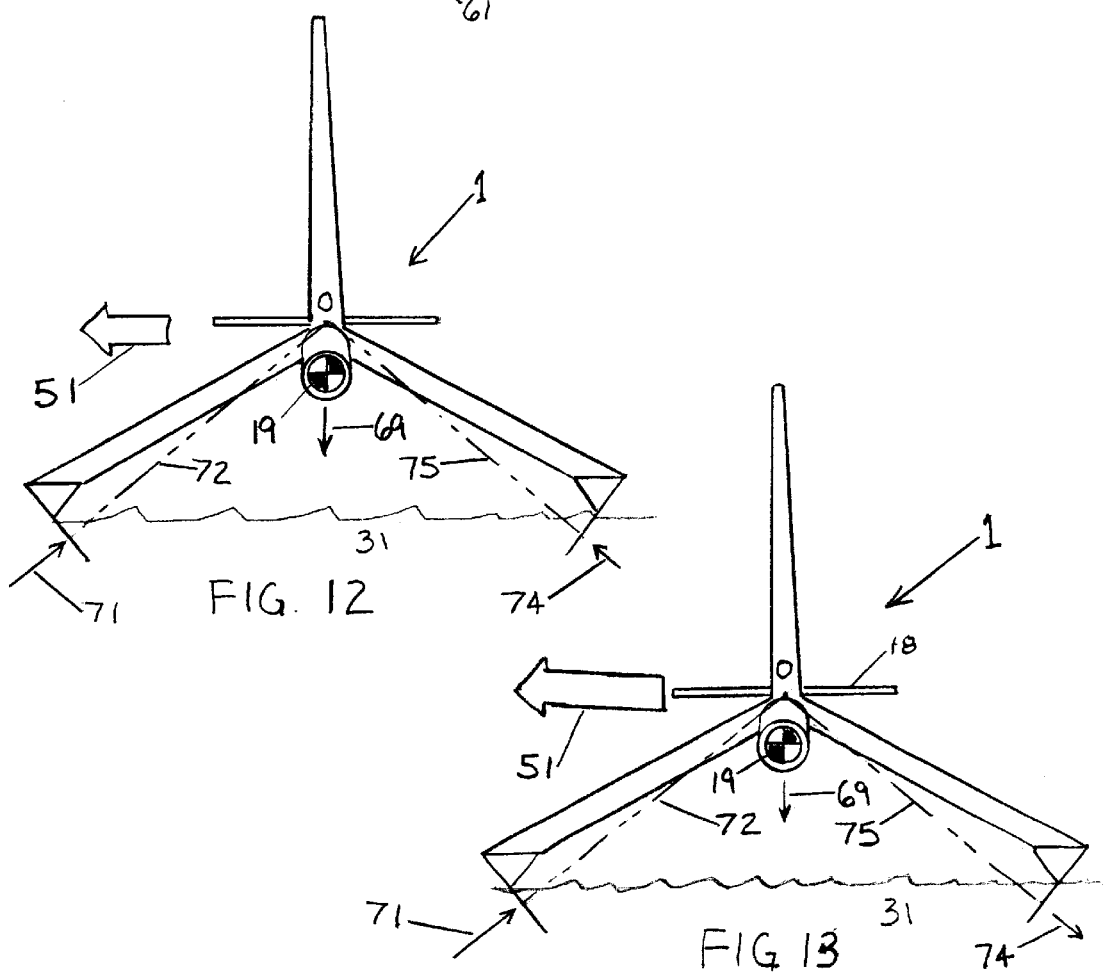
FIG. 12
FIG. 13

SAILING CRAFT STABLE WHEN AIRBORNE

PRIOR ART

Sailboats

A sailboat is a vehicle which travels on water, propelled by wind.

Kite Propulsion

A kite is an airfoil assembly tethered to the ground, to a person, or to something not moving with the wind. Kites are used to propel some sailboats. U.S. Pat. No. 57,996 to Chester W. Sykes is of a broad, flat balloon supporting sails for a sailboat. If used, the balloon would act as a kite. U.S. Pat. No. 4,497,272 to Sidney E. Veazey, U.S. Pat. No. 5,213,289 to David P. Barresi, U.S. Pat. No. 5,366,182 to William G. Roeseler and Cory Roeseler, and U.S. Pat. No. 5,435,259 to Gaudencio A. Labrador are of propulsion by kite. A kite produces a controllable force applied at a convenient point on a sailboat and operates in faster, smoother air than any other sailing device. Disadvantages of kites include difficulty in launching, possible tether entanglements with other objects—therefore requiring large air space, and a lower lift-to-drag ratio than other means due to the use of cloth and wind drag on tethers.

Multi-Hull Boats

A catamaran is a boat with two parallel hulls arranged so that it has more stability than said two hulls when separate. A trimaran is a boat with three hulls. Other multi-hull configurations have been proposed or tried. In general, a multi-hull boat is much more stable than a single hull of equal displacement. The exception to this is a multi-hull boat entirely capsized, in which case it is generally very stable in its capsized orientation, resisting return to an upright orientation.

Balancing Forces

A sailboat is acted on by forces: gravity, aerodynamic forces (from wind), buoyant forces and hydrodynamic forces (from motion of water relative to boat). The aerodynamic forces act on parts of the boat above water. The hydrodynamic forces act on parts of the boat underwater and oppose aerodynamic forces. This creates an undesirable moment causing the sailboat to lean.

A good solution is to cause all forces to act on one point, eliminating the moment. Kite tethers manifest the tension force, which is normally made to act on a boat's center of hydrodynamic lateral resistance. U.S. Pat. Nos. 612,209 to Fredrik Ljungström, No. 1,670,936 to Malcom McIntyre and Thomas A. McIntyre, No. 1,885,247 to John Phillips Fox, No. 2,126,665 to John T. Rowland, No. 2,170,914 to Rudow Rummler, No. 2,329,220 to Rudow Rummler, No. 3,094,961 to Bernard Smith, No. 3,455,261 to Hugh Perrin, No. 3,631,828 to Bernard Smith, No. 3,981,258 to Bernard Smith, No. 4,228,750 to Bernard Smith, No. 4,458,859 to Aaton P. Ganev, No. 4,478,164 to Michael J. Menear, No. 4,671,198 to Edwin des Snead, No. 4,708,075 to Edwin des Snead, No. 4,852,507 to Randall C. Ryon and Robert A. Austin, No. 4,864,949 to Eric Olsen, No. 4,934,296 to Bernard Smith, and No. 4,945,845 to James L. Johnson are of sails intended to align aerodynamic sail force with the boat's center of lateral resistance.

Airfoils and Hydrofoils

A hydrofoil is a wing intended for use under water. Often, sailboat keels and rudders are hydrofoils. Also, hydrofoils have been fitted to sailboats so as to lift the hull free from the water at high speed. The following are examples of such sailboats: John G. Baker's Monitor, Donald J. Nigg's Flying Fish, David A. Keiper's Williwaw and Greg Ketterman's Trifoiler.

A hydrofoil commonly has a sharp trailing edge and convex curved upper surface. Such shapes are the most efficient if attached water flow over the entire foil can be maintained. But for hydrofoils operating near the water surface, which is the case for all high-speed sailboats, two phenomena tend to occur which prevent such desired attached flow and reduce efficiency: ventilation and cavitation. Ventilation is the entrance of air into the flow of water around the foil and occurs with surface-piercing foils. Small planar surfaces attached perpendicularly to the hydrofoil, called fences, can eliminate some ventilation. Cavitation is the formation of water vapor bubbles in low-pressure areas of the flow. Near the water surface and in the absence of ventilation, cavitation is inevitable at speeds above a threshold of around 60 knots. Hydrofoils shaped to be efficient at speeds below this threshold are called subcavitating; those shaped to be efficient at speeds above this threshold are called supercavitating. Supercavitating hydrofoils may have a blunt trailing edge and a sharp leading edge and are generally less efficient than subcavitating foils at low speeds. But they are more efficient than subcavitating foils at high speeds. Recently much effort has been made to avoid cavitation, but supercavitating foils are the best available solution for speeds beyond the threshold.

A wingsail is an airfoil used for a sail. It can have a higher lift/drag ratio than a sail and therefore is more efficient than a sail when the relative wind is at a small angle to the course of the sailboat, for example, when close-hauled or tacking.

Aerohydrofoils

Bernard Smith defines the word aerohydrofoil on page 3 of his book, "The 40-Knot Sailboat", 1963:

"Stated in the simplest possible terms, the machine for deriving the ultimate in sailing speed consists of two vertical wings, an inverted one in the water joined to an erect one in the air. When coupled in this way the assembly may be likened to a sailboat that has a sail and a centerboard, but no hull; except that the sail is no longer a sail but an airfoil, and the centerboard is no longer a centerboard but a hydrofoil. In fact it is no longer a traditional sailboat and therefore has been renamed an 'aerohydrofoil.'"

I use aerohydrofoil to mean "a wind-propelled water vessel (sailboat) that consists mainly of airfoils and hydrofoils".

U.S. Pat. Nos. D337300 to Ernst-August Bielefeldt, No. D345542 to Ian J. Duncan, No. 2804038 to Hugh M. Barkla, No. 3,425,383, No. 3,532,067, No. 3,646,902, No. 5,063,869 to Ernst-August Bielefeldt, No. 5,113,775 to Robert W. Imhoff, No. 5,136,961 to Harold E. Follet, are of aerohydrofoils. Several model sailboats built by Bernard Smith and the full-size sailboats Yellow Pages Endeavour, by Lindsay Cunningham, and the French Vecteur Vitesse are successful aerohydrofoils. Aerohydrofoils are fast and efficient. Generally, they are complex and have limitations, such as linited performance on one tack, or confinement to smooth water.

Aerodynamic Control

High speed travel over water requires stability. If that stability come from the water, the sailboat must continuously have a control element in the water. A better solution is to derive stability and control from the passing air because the sailboat is always surrounded by air. The theoretical Merrimac described by Bernard Smith in "The 40-knot Sailboat" utilizes air rudders. John G. Walker has built successful wingsail sailboats with aerodynamic control of the wingsail (see U.S. Pat. No. D324,021). Robert W. Imhoff has built boats basically per his U.S. Pat. No. 5,113,775 in which, through a combination of sail and keel settings, the wind automatically correctly orients the boat.

Airborne Sailboats

A further improvement is to combine aerodynamic stability with airborne flight. Some sailboats travel fast enough to leave the water for limited distances. This is often an uncontrolled, nearly ballistic, mode of travel. Kite-propelled waterskiers and sailboard sailors have intentionally and somewhat controllably become airborne. U.S. Pat. No. 3,800,724 to Richard R. Tracy, No. 3,899,146 to James L. Amick, No. 3,966,143 to Gordon R. Smith, No. 3,987,982 to James L. Amick, No. 4,450,784 to Ellis Mellinger, No. 4.458,859 to Aaton P. Ganev and No. 5,181,674 to William J. Apgar are of sailboats which could become airborne.

The sailing machines defined in Amick's U.S. Pat. No. 3,899,146 and No. 3,987,982 and the self-launching glider described in Smith's U.S. Pat. No. 3,966,143 have the following disadvantages. The entire craft to flips to change tack. The cockpit is always tilted, except when changing tacks. The maximum wind force available is limited by the weight of the craft; that is, if an aerodynamic force beyond some threshold is applied, the craft necessarily becomes airborne, willy-nilly.

The hand-carryable flying sailboat described in Mellinger's U.S. Pat. No. 4,450,784 lacks aerodynamic control of relative wind direction.

The vehicles described in Tracy's U.S. Pat. No. 3,800,724 and Apgar's U.S. Pat. No. 5,181,674 require major changes in wing setting to change tack.

Land Yachts and Ice-Boats

Sailing craft exist for travel on land and ice (called, respectively, land yachts and ice-boats). In such craft, wheels or runners correspond to the hulls and hydrofoils of sailboats. Because of the availability of large flat surfaces of dirt or ice and because, generally, wheels and runners are lighter and efficient over a wider range of speeds than hulls and subcavitating hydrofoils, land yachts and ice-boats have achieved higher speeds than sailboats. But the problem of stable airborne behavior has not been solved in practice. So all such high-speed craft are designed to stay attached to the surface by ballast or aerodynamic force.

Aircraft

Fixed wing aircraft, and gliders in particular, of high efficiency have been developed. But no such actual aircraft have been launched by wind power alone. Therefore, all aircraft presently rely on other sources of power.

At present, the world sailboat speed record is under 50 knots, there is no aerohydrofoil suitable for transportation and there is no successful wind-launched sailplane. That is the state of the art.

OBJECTS AND ADVANTAGES

The object of the present invention is high speed wind propelled travel. Advantages of the present invention include superior maneuverability and control, stability in high winds, and stability in foilborne operation over moderate waves. Another advantage is the use of efficient supercavitating hydrofoils to eliminate any cavitation or ventilation problems. Compared to some boats of the prior art, this invention is simpler. Thus construction is easier and lighter. This invention can make a smooth transition from foilborne mode to airborne mode. No weight shifting or extreme changes in pilot position or attitude are required for any mode or change in mode of operation.

DRAWINGS

FIGS. 1–19 are of an embodiment of the present invention and demonstrate operation. FIGS. 20–38 show alternative embodiments and components.

FIG. 1 is a perspective view of the lambda-wing aerohydrofoil, showing its parts. It is named for its appearance as viewed from the front, which resembles an inverted Y, or more loosely, the Greek letter lambda ($\lambda$). Other embodiments presented later in this specification are also named by a resembling letter or symbol.

FIG. 4 is a perspective view, demonstrating starboard rudder, maintaining orientation of relative wind from the side.

FIG. 5 is a front view of same.

FIG. 6 is a top view of same.

FIG. 7 is a top view, moored or drifting, with neutral rudder and large pontoon toe-in.

Fi 8 is a top view of hullborne forward operation.

Figure 9:
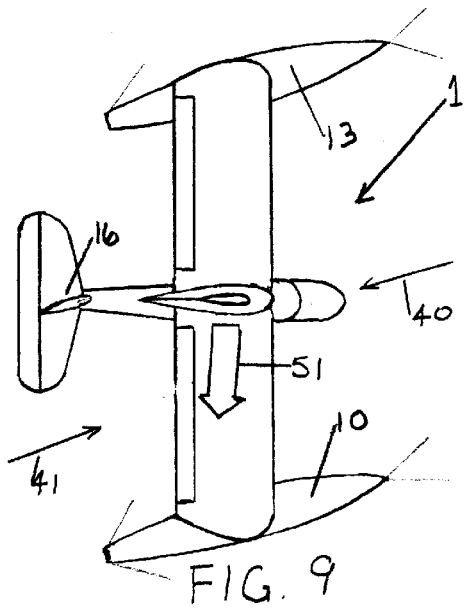

FIG. 9 is a top view of hullborne backward operation.

Figure 10:
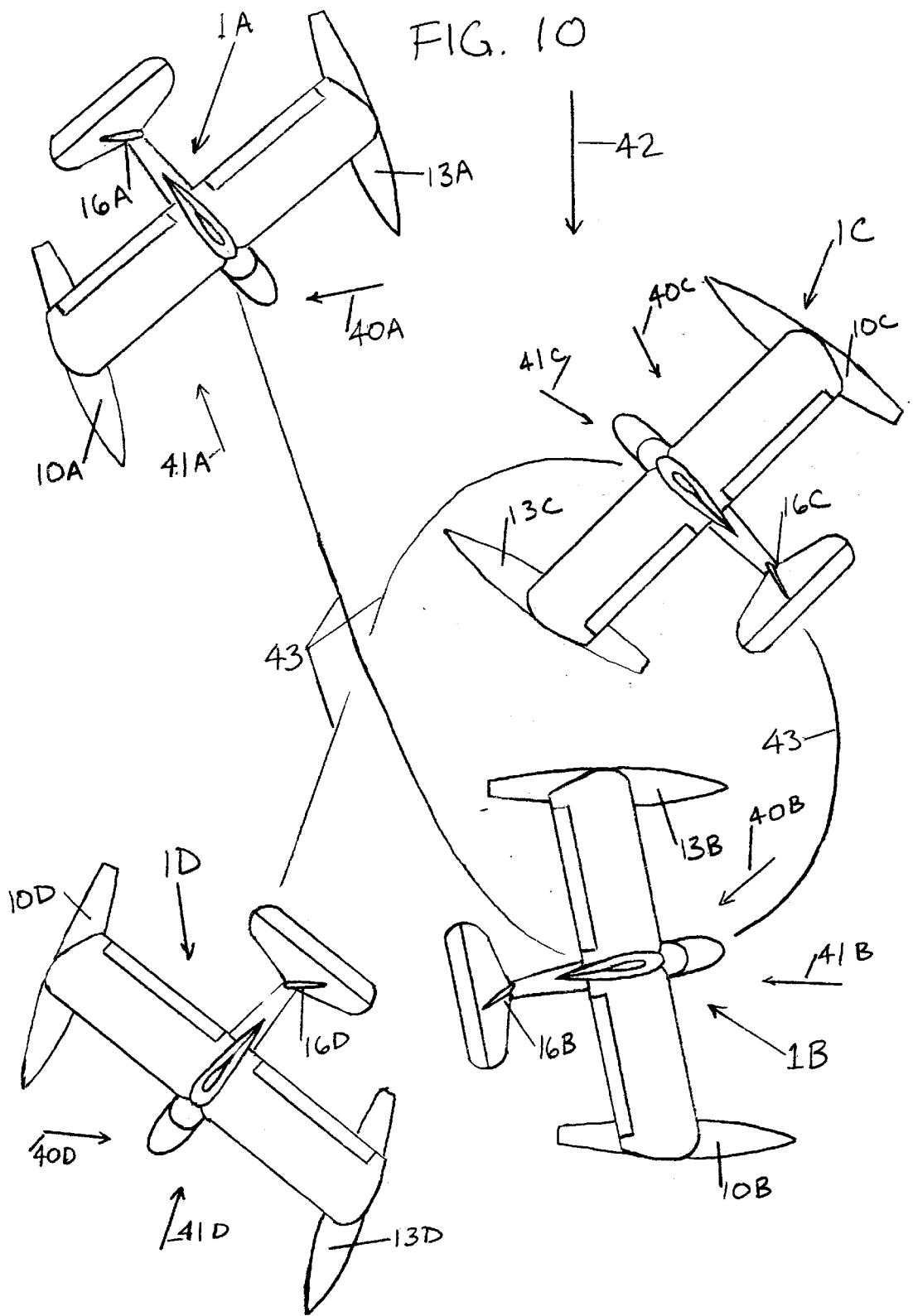

FIG. 10 is a top view of hullborne downwind operation with a change of tack.

FIG. 11 is a perspective view of foilborne operation showing both aerodynamic and hydrodynamic forces.

FIG. 12 is a front view of same.

FIG. 13 is a front view of same, but with increased forces present at higher speed.

Figure 14:
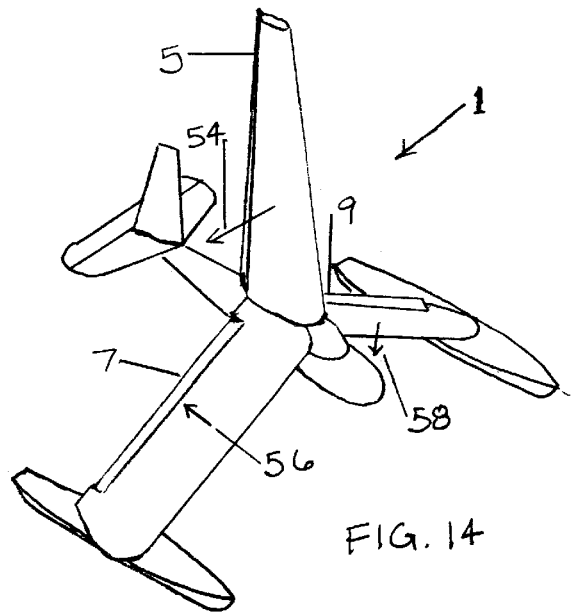

FIG. 14 is a perspective view, with aileron and flap deflection.

Figure 15:
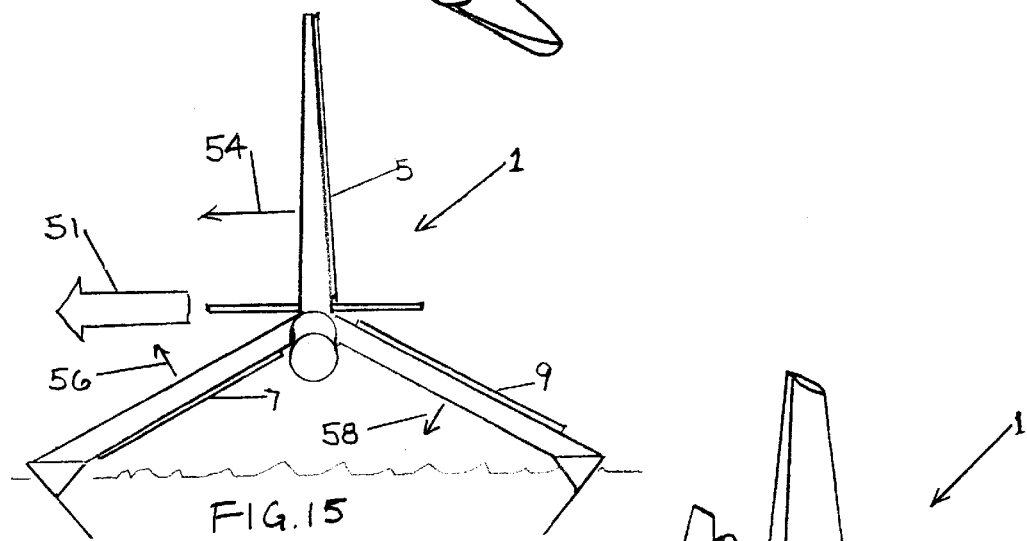

FIG. 15 is a front view of same.

Figure 16:
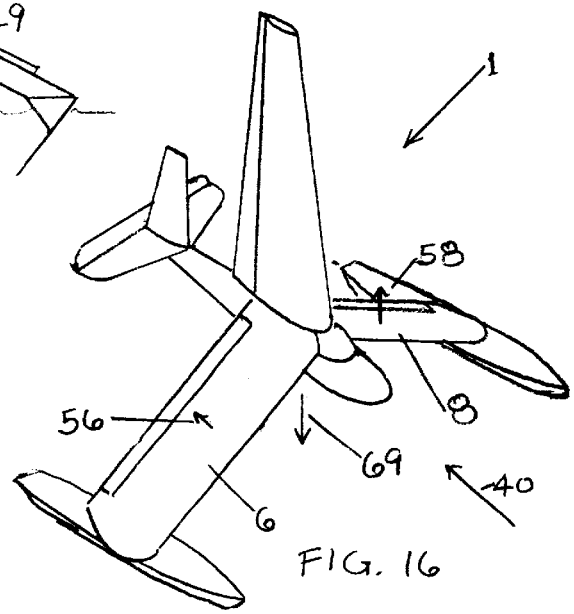

FIG. 16 is perspective view of airborne operation, in upright attitude.

Figure 17:
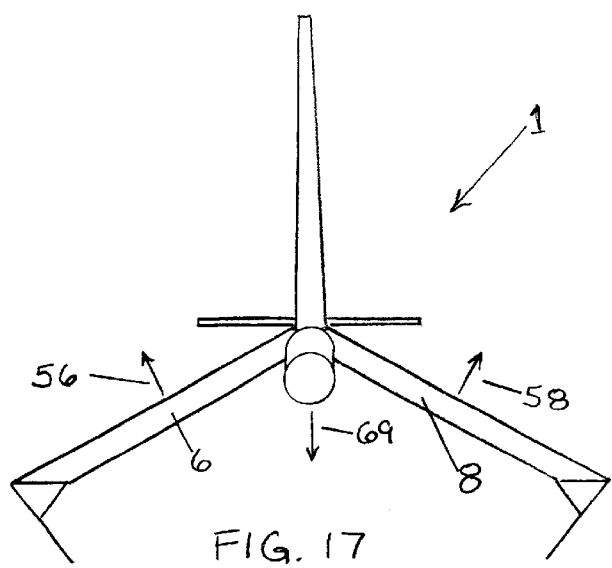

FIG. 17 is a front view of same

Figure 18:
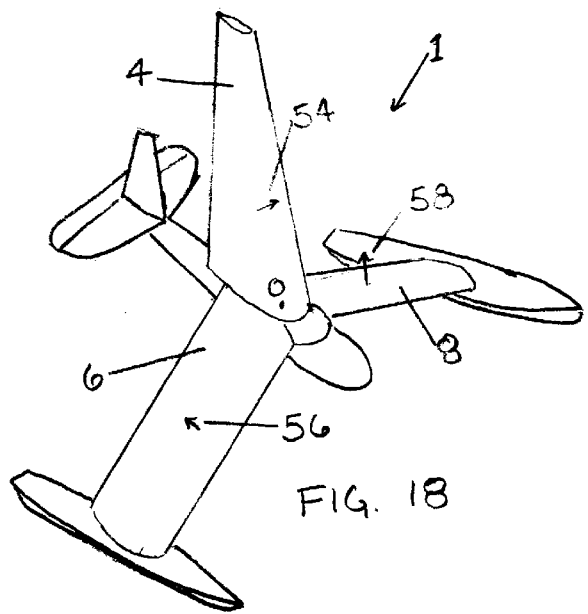

FIG. 18 is a perspective view of airborne operation in banked attitude.

Figure 19:
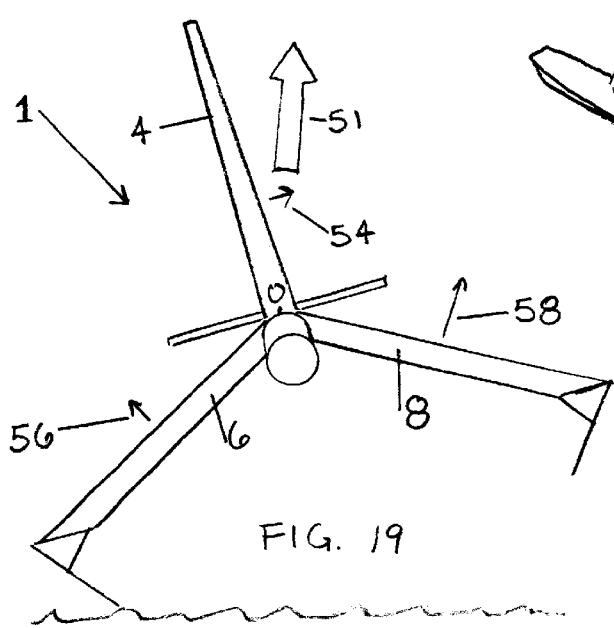

FIG. 19 is a front view of same.

Figure 20:
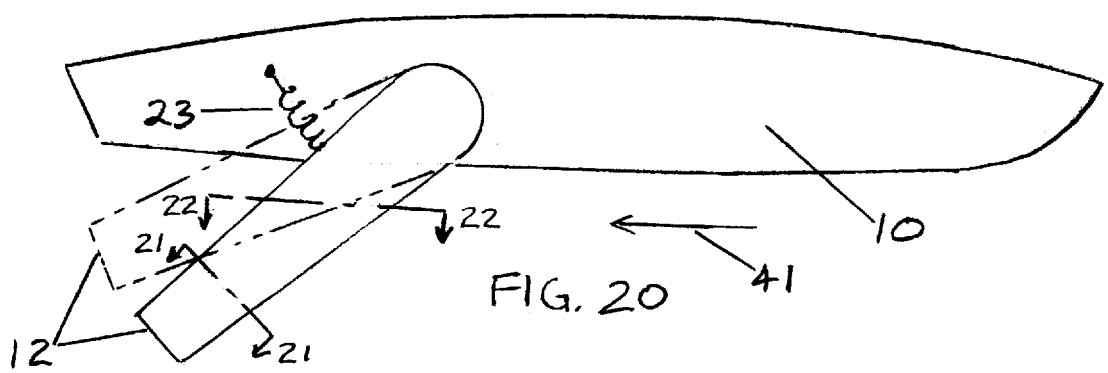

FIG. 20 is a perspective view of a pontoon and hydrofoil assembly.

Figure 21:

FIG. 21 is a perpendicular section view of a hydrofoil.

Figure 22:
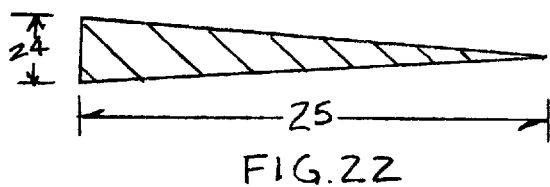

FIG. 22 is an oblique section view of a hydrofoil

Figure 23:
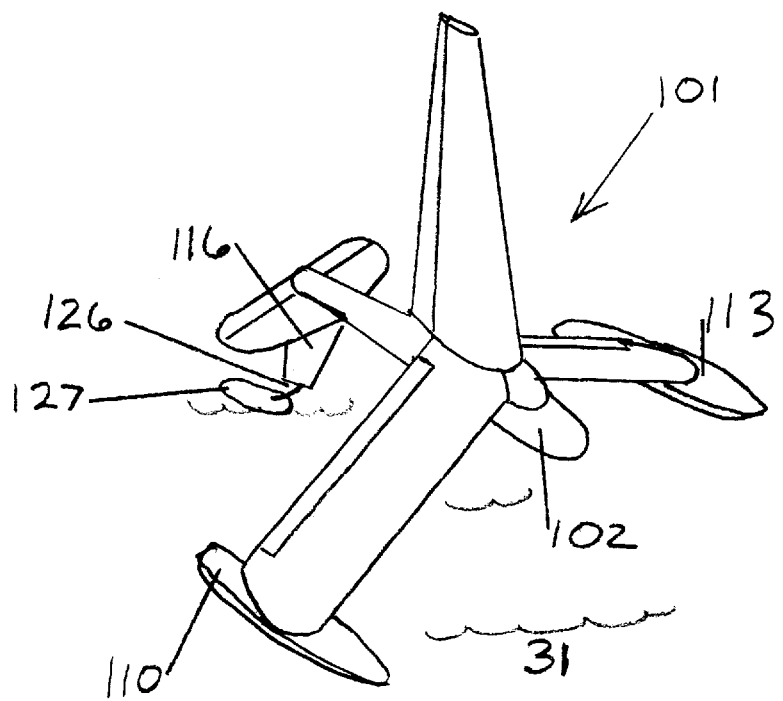

FIG. 23 is a perspective view of lambda-wing tail-dragger aerohydrofoil.

Figure 24:
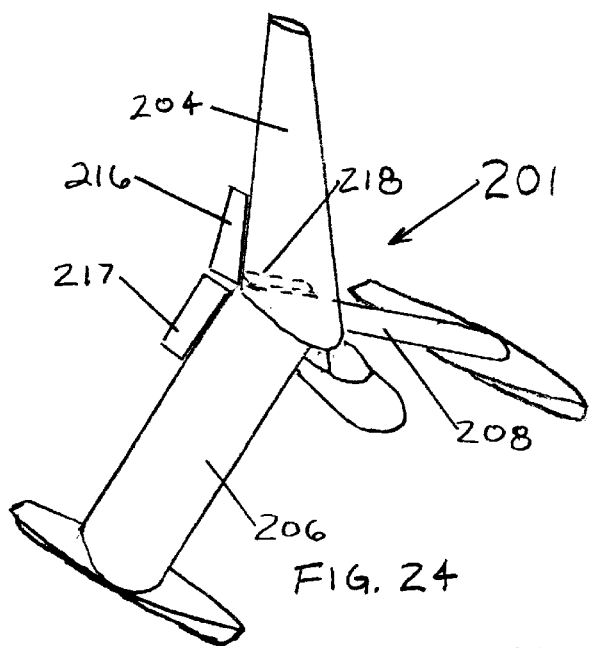

FIG. 24 is a perspective view of tail-less lambda-wing aerohydrofoil with sweepforward.

Figure 25:
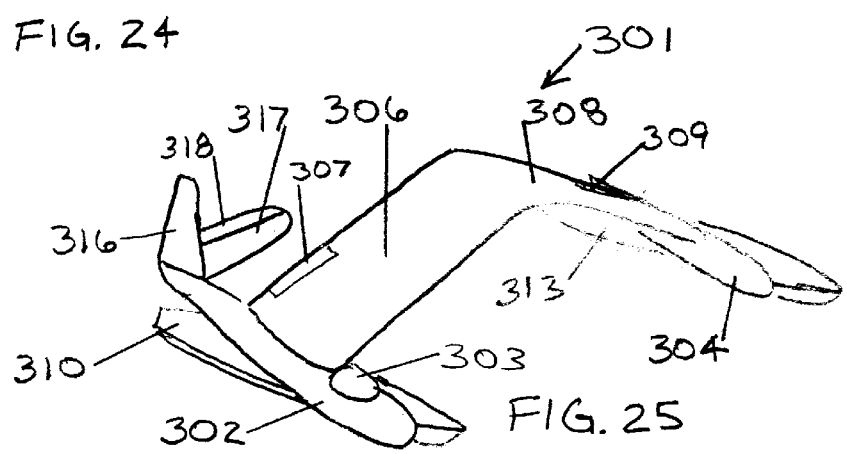

FIG. 25 is a perspective view of a two-wing aerohydrofoil.

Figure 26:
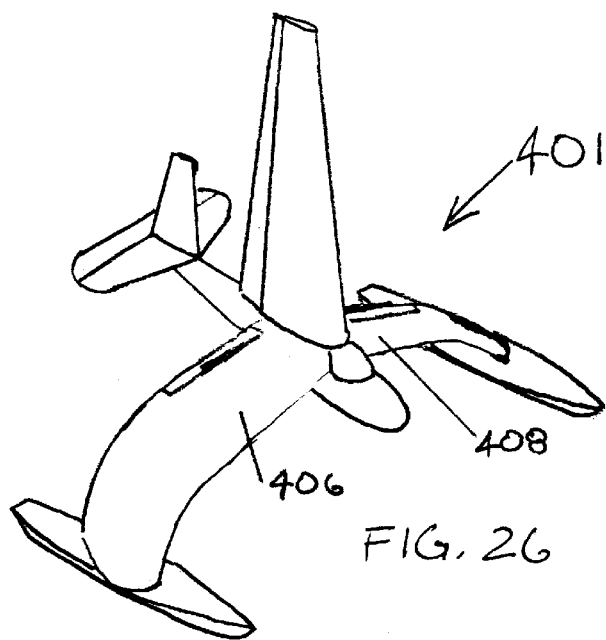

FIG. 26 is a perspective view of a bent-wing, lambda-wing aerohydrofoil.

Figure 27:
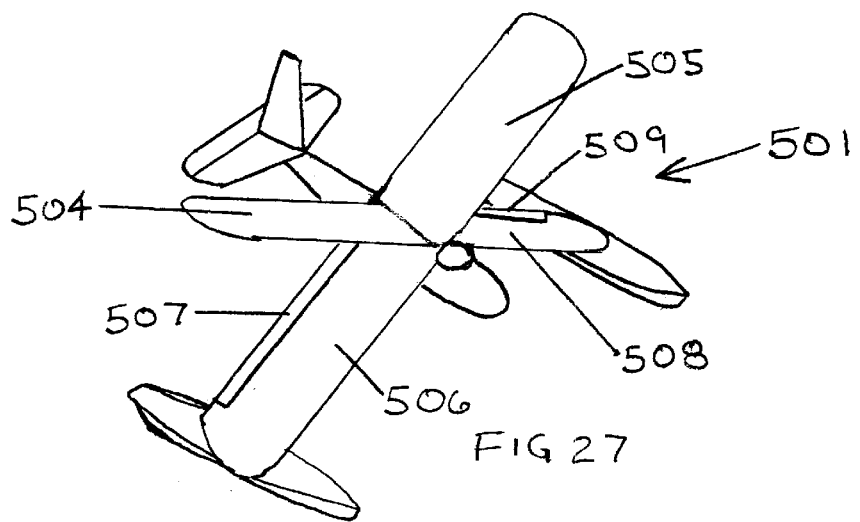

FIG. 27 is a perspective view of an X-wing aerohydrofoil.

Figure 28:
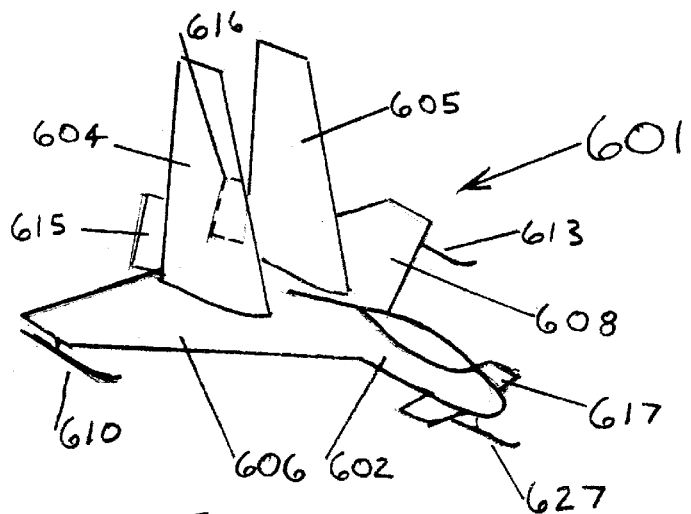

FIG. 28 is a perspective view of twin wingsail iceboat.

Figure 29:
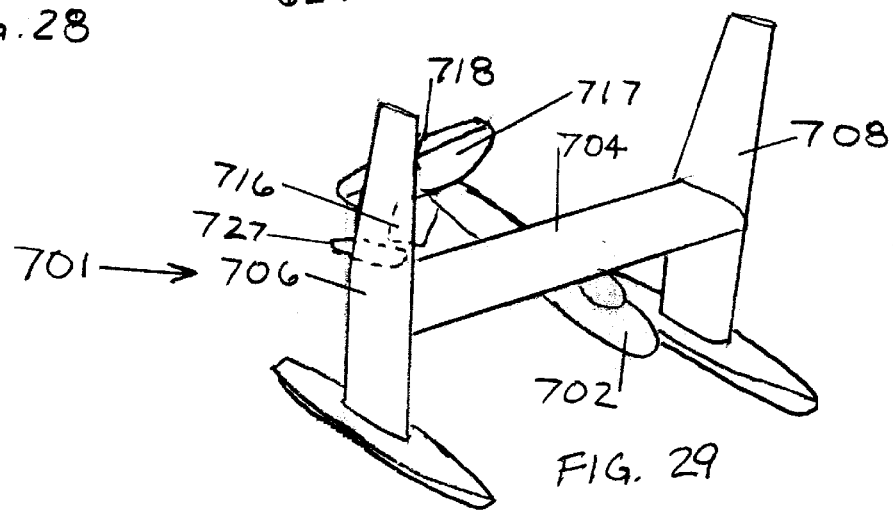

FIG. 29 is a perspective view of an H-wing aerohydrofoil.

Figure 30:
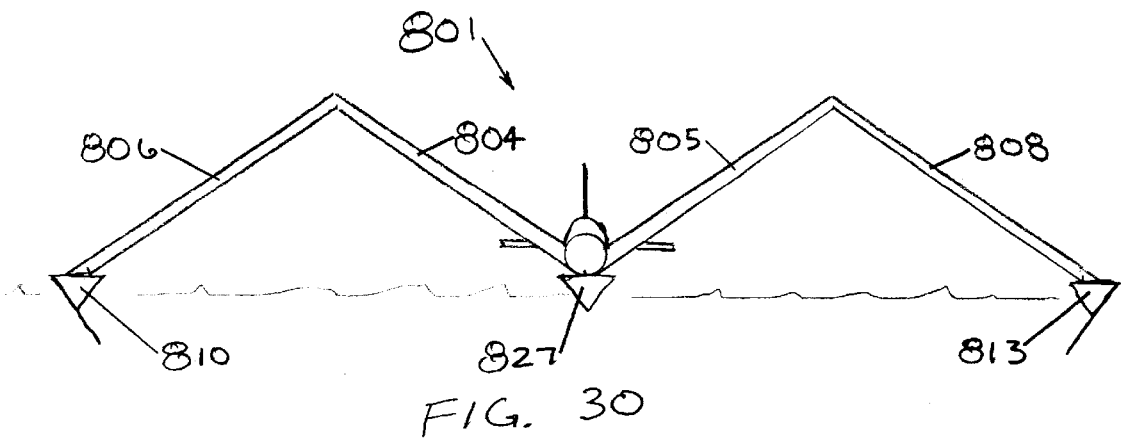

FIG. 30 is a front view of a gull-wing aerohydrofoil.

Figure 31:
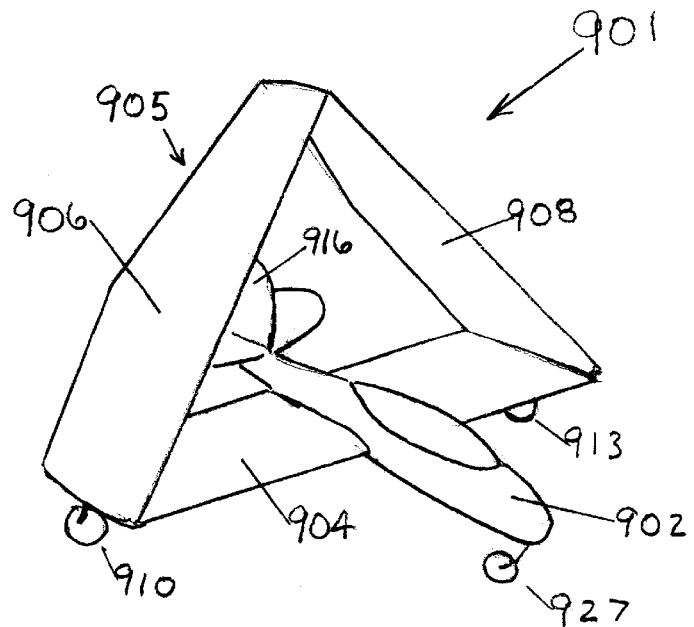

FIG. 31 is a perspective view of an A-wing land yacht.

OPERATION

The theory of operation will be explained in reference to an embodiment chosen for its sailing efficiency—the lambda-wing aerohydrofoil. Another embodiment may be preferred based on other criteria such as flight efficiency, buoyant stability, strength or safety. And, of course, this invention is not limited to the embodiments presented, but is defined by the claims, which are given last.

Parts of $\lambda$-Wing Aerohydrofoil

Figure 1:
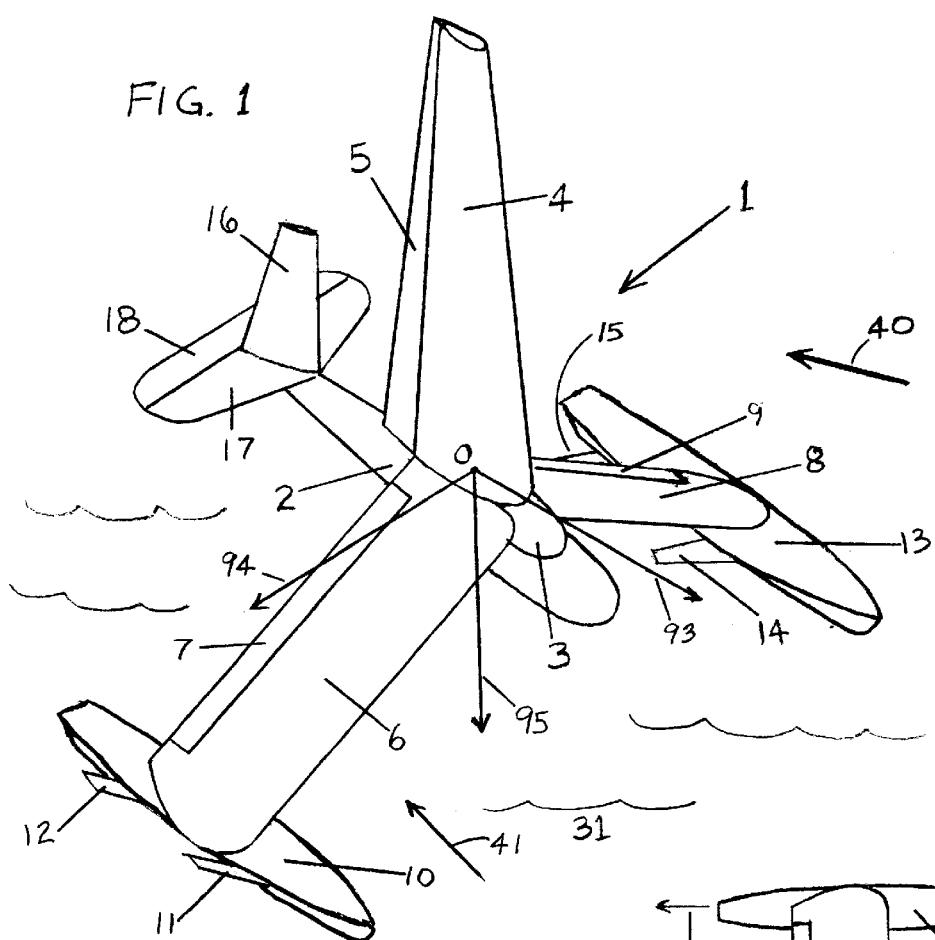

FIG. 1 shows a lambda-wing aerohydrofoil 1, hereinafter referred to as craft 1. For the purposes of orienting parts, craft 1 has an imaginary coordinate system comprising an origin 0 and three axes: an x-axis 93 pointing forward, a y-axis 94 pointing to starboard, and a z-axis 95 pointing down when craft 1 is upright. Craft 1 has a fuselage 2 connected to a dorsal wing 4, a starboard wing 6 and a port wing 8. The fuselage 2 is elongated in the x-axis 93 and contains a cockpit 3, just forward and down from the origin 0, housing controls and crew (not shown).

The dorsal wing 4 extends from the fuselage 2 near the origin 0 upward and has a full-length trailing edge flap or dorsal flap 5. The starboard wing 6 has a nearly full-length aileron 7, hereinafter referred to as starboard aileron 7. The starboard wing 6 extends from fuselage 2 near the origin 0 outwardly and down. At its distal end, the starboard wing 6 pivotally connects to a starboard pontoon 10, with an axis of rotation substantially parallel to z-axis 95. The starboard pontoon 10 connects to a starboard fore hydrofoil 11 and a starboard aft hydrofoil 12, oriented substantially as shown in FIG. 1. Craft 1 is substantially symmetric, notwithstanding variations such as pontoon rotation or flap deflection. Thus, in a symmetric manner to the starboard side, the port wing 8 has a nearly full-length port aileron 9 and pivotally connects to a port pontoon 13, which has a port fore hydrofoil 14 and port aft hydrofoil 15.

At the rear end of fuselage 2 are two airfoil surfaces: a vertical all-moveable rudder 16 and a horizontal stabilizer 17, which has a trailing edge flap or elevator 18.

There may be various arrangements of pedals, levers, wheels or cranks within the cockpit 3 or elsewhere, and various systems cables, pulleys, gears or chains throughout the craft 1 to control rotation or setting of the pontoons 10 and 13, ailerons 7 and 9, dorsal flap 5, elevator 18 and rudder 16. Such systems may be similar to a glider control system or may be similiar to that described by James L. Amick in U.S. Pat. No. 3,804,428. But a method of construction of suitable control systems would be obvious to a craftsman skilled in the arts of sailboat and aircraft construction. Therefore, such are not described or shown, nor is the present invention limited to any particular such system.

Rudder Controls Yaw

The craft 1 typically operates in a relative wind 40 coming from the front at some angle less than 90 degrees off the x-axis 93. The craft 1 also moves along the surface of a body of water 31. Relative to the craft 1, the water 31 also comes from the front at some angle less than 90 degrees off the x-axis 93, but on the opposite side of the relative wind. This relative water velocity 41 is shown in FIG. 1.

Figure 2:
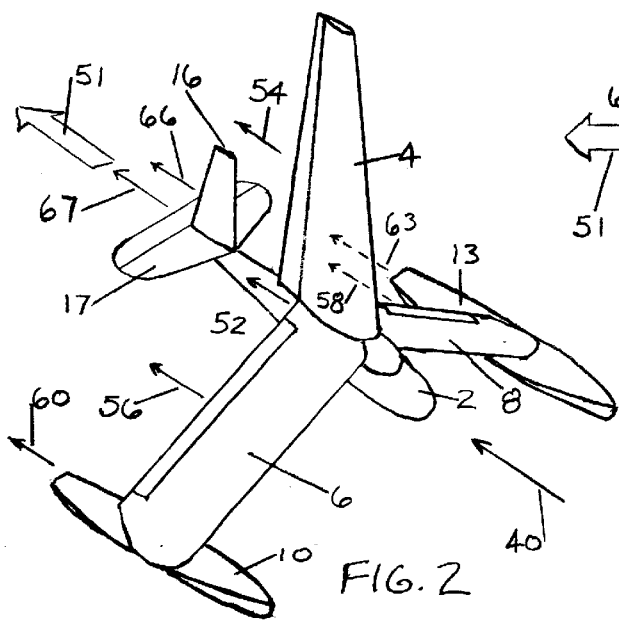
FIG. 2 is a perspective view, demonstrating neutral rudder maintaining orientation straight into relative wind.
Figure 3:
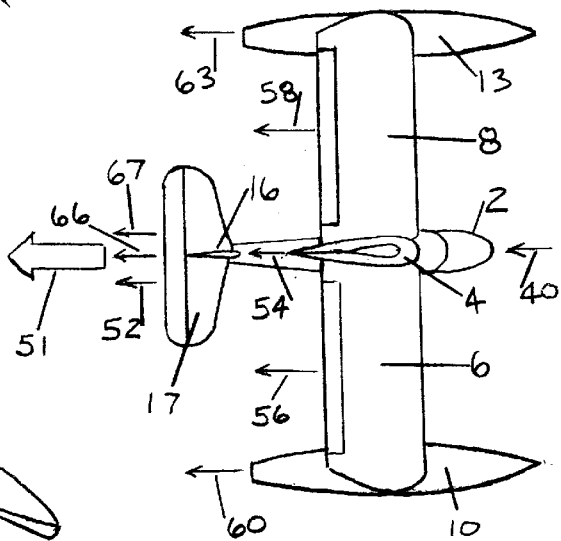
FIG. 3 is a top view of same.

The rudder 16 is used to orient in yaw the craft 1 in relation to the relative wind 40 and thus controls the aerodynamic forces applied to the craft 1. FIGS. 2 and 3 show craft 1 with rudder 16 in a neutral position. Also, all other moveable parts are in a neutral position. The rudder 16 causes the craft 1 to orient itself such that the relative wind 40 is coming head-on. Every part of the craft 1 experiences some aerodynamic force. In particular, there are aerodynamic forces 52, 54, 56, 58, 60, 63, 66 and 67 acting on, respectively, fuselage 2, dorsal wing 4, starboard wing 6, port wing 8, starboard pontoon 10, port pontoon 13, rudder 16 and horizontal stabilizer 17. (The hydrofoils 11, 12, 14 and 15 also may undergo aerodynamic forces, but will be ignored for the present discussion.) Due to the orientation of the relative wind 40, all such aerodynamic forces are drag forces, that is they all point in the direction of the relative wind. Therefore, the total resultant aerodynamic force 51 on the craft 1 is directed backward. Also, since the craft 1 is cleanly formed, the total resultant aerodynamic force 51 is relatively small.

FIGS. 4, 5 and 6 show the craft 1 with rudder 16 deflected to starboard. All other moveable parts are in a neutral position. The rudder 16 causes the craft 1 to orient itself such that the relative wind 40 is coming from the front on the port side. Again, every part of the craft 1 experiences an aerodynamic force. But in this case, dorsal wing 4, starboard wing 6, and port wing 8 experience forces 54, 56 and 58, respectively, each of which is nearly perpendicular to the direction of the relative wind 40. Due to the clean shape of the craft 1, the other forces forces 52, 60, 63, 66 and 67 are relatively small. Therefore the total resultant aerodynamic force 51 aligns closely with the y-axis 94. As seen in FIG. 5, force 54 applied to dorsal wing 4 tends to rotate the craft 1 counterclockwise about origin 0, but the forces 56 and 58 applied to the starboard wing 6 and port wing 8 respectively, tend to rotate the craft 1 clockwise about origin 0, thus putting the center of effort (not shown) near the origin 0. (An arrow 80 in FIG. 5 shows the direction of view of FIG. 20.)

Note that vector quantities such as velocity and force are three-dimensional, but are necessarily shown in two dimensions. Thus, apparent distortions occur. For example, FIG. 5 apparently shows relative wind 40 aligned with the y-axis 94. But FIG. 6 shows the relative wind 40 properly, that is, aligned mostly aft and only partially with the y-axis 94.

(Not shown) In the absence of dominant buoyant and hydrodynamic forces, the horizontal stabilizer 17 and elevator 18 control the angle of the relative wind 40 in pitch in a manner similar to that of the rudder 16 controlling the angle of relative wind 40 in yaw.

Moored

Figure 7:
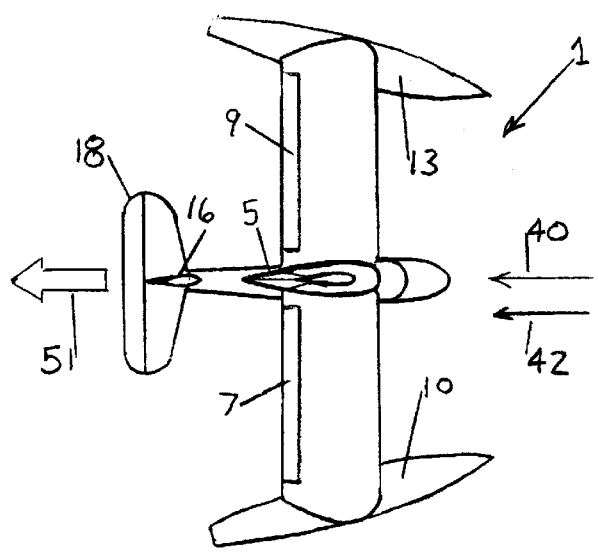

FIG. 7 shows the craft 1 in a configuration suitable for stopping, mooring to an anchor or buoy, or "lying ahull" in open waters. The rudder 16, dorsal flap 5, ailerons 7 and 9, and elevator 18 are each in a neutral position. Port pontoon 13 points to starboard and starboard pontoon 10 points to port. In other words, the pontoons 13 and 16 are toed-in. In such a configuration, the craft 1 will keep itself oriented directly into the relative wind 40, which will be substantially equal to the true wind 42, or wind relative to the water surface. The craft 1 will experience a total resultant aerodynamic force 51 directly backward. Thus it will be stable even in strong winds.

Hullborne, Forward

Figure 8:
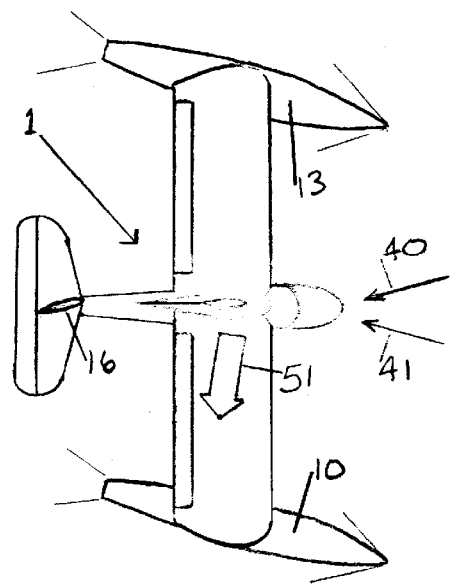

FIG. 8 shows the craft 1 travelling forward slowly hullborne, or supported buoyantly by pontoons 10 and 13. The rudder 16 is to starboard, causing relative wind 40 to come from port, as shown in FIG. 8. This causes the total resultant aerodynamic force 51 to act on the craft 1, pushing it substantially along the y-axis 94. Pontoons 10 and 13 are substantially parallel to one another and both point to starboard. This pontoon orientation makes use of the force 51 to create forward motion. The relative water velocity 41 is aligned substantially with the longitudinal axis (not shown) of either pontoon 10 or 13. (Not shown) By varying rudder angle and pontoon angle, a wide range of courses may be set.

Hullborne, Backward

FIG. 9 shows the craft 1 travelling backward slowly. Setting of rudder 16, relative wind 40, and total resultant aerodynamic force 51 are all as they are for forward motion. But Pontoons 10 and 13 point to port. This pontoon orientation makes use of the aerodynamic force 51 to push the craft 1 backwards.

Change of Tack

Unlike ordinary sailboats, changing tack going upwind is done without danger of losing directional control. To do so, the rudder 16 is swung to its opposite side and the pontoons 10 and 13 are swung so as to point toward the side opposite which they currently point (not shown). Since steering control relies on relative wind 40, not relative water velocity 41, the craft 1 may come to a complete stop or even go backwards during the maneuver without directional control ever being lost.

Changing tack going slowly downwind requires performing a loop, as shown in FIG. 10. A lambda-wing aerohydrofoil or craft 1A, 1B, 1C and 1D is shown in subsequent steps of the maneuver, the letter A, B, C or D indicating the step. The true wind 42 remains constant and illustrates that craft 1A is on a port downwind tack. Rudder 16A of craft 1A is to starboard, pontoons 10A and 13A also point to starboard. Thus, relative wind 40A is aligned with rudder 16A and relative water velocity 41A is aligned with pontoons 10A and 13A, as shown in FIG. 10. The craft 1A, 1B, 1C, 1D follows a path 43, which loops around eventually to a starboard downwind tack as shown in FIG. 10 and as further described herein. Craft 1B, being the same as craft 1A, but at a subsequent step, is on a broad reach on a starboard tack. This is accomplished by setting rudder 16B to starboard, but at a smaller angle than rudder 16A, and by pointing pontoons 10B and 13B so as to point to starboard, but at a smaller angle than pontoons 10A and 13A. As a result, relative wind 40B and relative water velocity 41B are as shown. Continuing to step C, craft 1C is close-hauled on a port tack Rudder 1C is slightly to port and pontoons 10C and 13C point slightly to port. Thus, relative wind 40C and relative water velocity 41C are as shown. Finally, craft 1D heads on a downwind course on a port tack, by assuming a substantially symmetric configuration to craft 1A on a starboard tack. That is, rudder 16D is to port and pontoons 10A and 13A point to port, thus controlling relative wind 40C and relative water velocity 41C, as shown in FIG. 10. To summarize the maneuver, rudder 16A is swung to the opposite side and pontoons 10A and 13A are swung so as to point toward the opposite side. This is the same as changing tack going upwind, except that making the changes in configuration sends the craft 1A, 1B, 1C, 1D on the loop path 43 instead of a simple turn.

Changing tack downwind at high speed may be accomplished as if going upwind (not shown), that is, without the loop path 43. This will only work if the craft 1 has sufficient momentum and the relative wind 40 continues coming from the front throughout the maneuver.

Foilborne

If the craft 1 achieves sufficient forward speed in hullborne operation, as described hereinbefore, the hydrofoils 11, 12, 14 and 15 will support the craft 1 hydrodynamically and lift pontoons 10 and 13 out of the water 31, as shown in FIGS. 11 and 12. The water 31 flowing across the hydrofoils 11, 12, 14, and 15 produces respective hydrodynamic forces 61, 62, 64 and 65 on each hydrofoil, as shown in FIG. 11. The hydrodynamic forces 61 and 62 acting on the starboard hydrofoils 11 and 12 are shown combined as a single resultant force 71 in FIG. 12. Similarly, the hydrodynamic forces 64 and 65 acting on the port hydrofoils 14 and 15 are shown combined as a single resultant force 74 in FIG. 12. (Note: Since FIG. 12 is a front view, port and starboard are reversed.) Extension lines 72 and 75 are drawn respectively for starboard and port resultant hydrodynamic forces 71 and 74, showing they act approximately through the origin 0. The aerodynamic force 51, also acts approximately through the origin 0. Since the relative water velocity 41 is from starboard, the starboard resultant hydrodynamic force 71 is greater than the port hydrodynamic force 74. Weight, or gravity, 69 acts through the center of mass 19, and also through the origin 0. Since all forces act approximately through the origin 0, they naturally balance with very little moment.

FIG. 13 is a front view of the lambda-wing aerohydrofoil at very high speed. The resultant aerodynamic force 51 is much greater. The starboard resultant hydrodynamic force 71 is much greater. But the port resultant hydrodynamic force 74 acts downward. This is achieved by slight pontoon toe-out or by use of the elevator 18 for a more nose-down orientation (not shown). Again, all forces act approximately through the origin 0 and balance.

Dorsal Flap, Ailerons

FIGS. 14 and 15 demonstrate the use of the dorsal flap 5 and ailerons 7 and 9. The dorsal flap 5 is deflected to port. This causes the aerodynamic force 54 on the dorsal wing 4 to be greater than if the dorsal flap 5 were in a neutral position. But it also tends to overturn the craft 1 counterclockwise as seen in FIG. 15. The starboard aileron 7 is deflected downward and the port aileron 9 is deflected upward. This creates greater forces 56 and 58, respectively, on the starboard and port wings 6 and 8 than if the ailerons 7 and 9 were in a neutral position. But these forces 56 and 58 tend to rotate the craft 1 clockwise as seen in FIG. 15 and thereby counteract the overturning moment of the force 54 on the dorsal wing 4. Thus the ailerons 7 and 9 can be used to eliminate any resultant moment of the various forces acting on the craft 1. Moreover, this use of the ailerons 7 and 9 increases the aerodynamic force 51 in the desired direction.

Airborne Operation

When the craft 1 attains sufficient speed, it may become airborne. This is done by setting dorsal flap 5, ailerons 7 and 9, pontoons 10 and 13, and rudder 16 to their respective neutral positions and by deflecting the elevator 18 up. The craft 1 will then orient itself in relation to the relative wind 40 such that the aerodynamic forces 56 and 58 on starboard and port wings 6 and 8 respectively are sufficient to support the weight 69 of the craft 1. Then the craft 1 will be airborne, or gliding, as shown in FIGS. 16 and 17.

FIGS. 18 and 19 show craft 1 gliding in a banked attitude. The aerodynamic force 56 acting on the starboard wing 6 is less than the aerodynamic force 58 acting on the port wing 8. This is due to the anhedral angle of the starboard and port wings 6 and 8. This also causes an undesirable moment tending to increase the angle of bank. But the aerodynamic force 54 on the dorsal wing 4 acts to decrease the angle of bank, that is, it counteracts the moment caused by the starboard and port wings 8 and 6. Thus, the total resultant aerodynamic force 51 effectively acts on a point on the craft 1 near the origin 0.

The craft 1 may be controlled in gliding flight through the use of the rudder 16, elevator 18, and ailerons 7 and 9, in much the same way a that a glider or airplane is controlled. In the absence of an adequate updraft, gliding flight will continue with decaying speed until either the craft 1 is too slow to remain airborne, i.e. it stalls, or it is controllably returned to the surface of the water 31. It may be "landed" on the surface of the water in the same manner as a seaplane with the precaution that the pontoons 10 and 13 should be oriented to align with the relative water velocity 41 (not shown).

Hydrofoil

FIG. 20 is a side view of the starboard pontoon 10 with starboard aft hydrofoil 12. The direction of view is shown by arrow 80 in FIG. 5. The hydrofoil 12 is mounted pivotally so as to rotate in a plane that is coplanar with the longitudinal axis of the hydrofoil and the longitudinal axis of the pontoon. A spring 23 maintains the hydrofoil 12 in a preferred angle, while allowing it to pivot upon impact with waves or submerged obstacles. FIG. 21 shows the perpendicular transverse section 21—21 of the hydrofoil 12. An oblique transverse section 22—22, taken parallel to the relative water velocity 41, is shown in FIG. 22. By sweeping back the hydrofoil, the drag is decreased by decreasing the ratio of hydrofoil thickness 24 to effective hydrofoil chord length 25 as shown in FIG. 22.

Other Embodiments

The embodiment hereinbefore presented is one of many possible embodiments of the present invention, each operable in a similar fashion. The airfoil arrangement serves to provide an aerodynamic force acting at substantially a single point, in a chosen direction. But, many different fixed arrangements of two or more airfoils will serve this same purpose. The purpose of the air rudder 16 and horizontal stabilizer 17 with elevator 18 is to orient the craft 1 relative to the relative wind 40. But other aerodynamic means may serve the same purpose. For example, slats, slots, flaps, split flaps, and fowler flaps as are used on airplane wings would work as well. The dorsal flap 5 is not essential. The pontoons 10 and 13, and hydrofoils 11, 12, 14, and 15 serve as traction means or running gear, intended to allow motion only in a given direction. But wheels, skis, caterpillar tracks, skates, runners, sleds, toboggans, guides, and similar means would serve the same purpose. Also, the orientation of each of the pontoons 10 an 13 (or other traction means) may be the same, that is, toe-in and toe-out control may be eliminated. Or one or more traction means may freely swivel. The craft 1 is shown operating on water, but may operate on land, ice, snow, or other support surfaces, if provided with suitable traction means. Some examples of further embodiments are given below.

Lambda-Wing Tail-Dragger Aerohydrofoil

FIG. 23 shows a lambda-wing tail-dragger aerohydrofoil 101 that is substantially the same as the lambda-wing aerohydrofoil 1 with the following exceptions. Its rudder 116 depends from its fuselage 102. A tail float 127 attaches to a flexible strut 126 which freely swivels on the bottom of the rudder 116. Its pontoons 110 and 113 are shorter, because their length is not necessary for buoyant pitching stability. The tail float 127 is not used for steering and does not contact the water 31 during high speed operation.

Tail-Less Lambda-Wing Aerohydrofoil

FIG. 24 shows a tail-less lambda-wing aerohydrofoil 201. Its dorsal wing 204, starboard wing 206, and port wing 208 are swept forward. Its rudder 216, starboard elevator 217 and port elevator 218 are directly attached to the wings 204, 206, and 208, respectively.

Two-Wing Aerohydrofoil

FIG. 25 shows a two-wing aerohydrofoil 301 with a starboard fuselage 302 connected to the lower end of a tilted starboard wing 306, which connects at its upper end to a tilted port wing 308, which connects at its lower end to a port fuslelage 304. Starboard and port ailerons 307 and 309 extend along the lower half of the trailing edges of starboard and port wings 306 and 308, respectively. The starboard fuselage 302 contains a cockpit 303 which houses crew and controls (not shown). The port fuselage 304 may contain cargo or ballast (not shown). A horizontal stabilizer 317 with elevator 318 and all-moveable rudder 316 attach to the rear of the starboard fuselage 302. Starboard and port pontoons 310 and 313 pivotally attach to the bottoms of the starboard and port fuselages 302 and 304, respectively.

Bent-Wing Lambda-Wing Aerohydrofoil

FIG. 26 shows a bent-wing lambda-wing aerohydrofoil 401 with bent starboard and port wings 406 and 408.

X-Wing Aerohydrofoil

FIG. 27 shows an X-wing aerohydrofoil 501, which has starboard lower wing 506, starboard upper wing 504, port lower wing 508 and port upper wing 505. The ailerons 507 and 509 are on the lower wings 506 and 508.

Twin Wingsail Iceboat

FIG. 28 shows an iceboat 601 with starboard wing 606, port wing 608, starboard wingsail 604 and port wingsail 605, which are all rigidly attached. A canard 617 is connected to the front of the fuselage 602. Starboard and port rudders 615 and 616 are connected to the trailing edge of the starboard and port wingsails 604 and 605, respectively. There is a starboard runner 610 and port runner 613 pivotally attached to the distal ends of the starboard and port wings 606 and 608 respectively, which are steered in unison. A front runner 627 is pivotally attached to the front of the fuselage 602, but pivots freely.

H-Wwing Aerohydrofoil

FIG. 29 shows an H-wing aerohydrofoil 701. A horizontal wing 704 connects to the top of a fuselage 702, which has an all-moveable rudder 716, horizontal stabilizer 717 and elevator 718, much like an ordinary glider (not shown). A starboard vertical airfoil 706 and port vertical airfoil 708 connect to the distal ends of the horizontal airfoil 704. Pontoons 710 and 713 pivotally connect to the lower ends of the vertical wings 706 and 708, and are steerable. A float 727 pivotally attaches to the lower end of the rudder 716 and pivots freely.

Gull-Wing Aerohydrofoil

FIG. 30 shows a gull-wing aerohydrofoil 801 with wings 804, 805, 806, and 808 shaped much like a seagull (not shown). Its three pontoons 810, 813, and 827 are steerable in unison.

A-Wing Land Yacht

FIG. 31 shows a land yacht 901 with a triangular, or A-, wing assembly 905 consisting of a horizontal wing 904, a starboard inclined wing 906, and port inclined wing 908. A starboard wheel 910 and a port wheel 913 are pivotally attached to the extreme ends of the horizontal wing 904 and are steered in unison. A front wheel 927 is pivotally attached to its fuselage 902, but pivots freely. Steering is accomplished with a rudder 916.

CONCLUSION

The main improvement over the prior art is the use of fixed airfoil configurations to do what was considered possible only with moveable configurations or major weight or attitude shifts. This makes construction easier and operation safer. Stable airborne operation of sailboats is not a fantasy or a luxury, it is a missing element of safety in modern high-speed sailing.

I claim:

1. A wind-propelled vehicle capable of travel on a support medium; said vehicle comprising:

an airfoil assembly comprising a plurality of airfoils fixedly joined; said airfoil assembly having substantially a single particular usual upright attitude in relation to said support medium when said vehicle uses wind for propulsion;

aerodynamic means for orientation of said airfoil assembly in pitch, in relation to a relative wind;

aerodynamic means for orientation of said airfoil assembly in yaw, in relation to a relative wind; the aerodynamic yaw orientation means comprising one or more rotatable surfaces, each said rotatable surface having a neutral position and rotatable within a range of at least 150 degrees, from −75 degrees to 75 degrees in relation to its said neutral position;

at least one traction means for controlling direction of movement of said vehicle relative to said support medium; each said traction means allowing motion of said vehicle in a particular direction and its opposite, hereinafter called respectively forward and reverse, and resisting motion of said vehicle in directions not substantially aligned with either said forward or said reverse direction; all said traction means being steerable in unison only, relative to said airfoil assembly, whereby all said traction means have substantially the same forward direction at any given time; said traction means being substantially coplanar, whereby all said traction means are capable of contact with said support medium at the same time;

a vertical pivot axis passing through the centroid of all surfaces of said traction means in contact with said support medium when airfoil is in its usual upright attitude; said vertical pivot axis being perpendicular to said support medium;

wherein both the aerodynamic yaw orientation means and the aerodynamic pitch orientation means rely only on the presence of said relative wind; whereby said vehicle may be effectively oriented both when in contact with, and when not in contact with, said support medium;

wherein, when each said rotatable surface is in its said neutral position, the volume of the solid of revolution generated by revolving collectively said rotatable surfaces of the aerodynamic yaw orientation means completely about said vertical pivot axis, is greater than half the volume of the solid of revolution generated by revolving all fixed airfoil surfaces of said vehicle completely about said vertical pivot axis;

wherein the combined surface area of said airfoils fixedly joined, of said airfoil assembly, comprises at least 70 percent of the combined surface area of all airfoils of the entire vehicle;

wherein the combined surface area of all said traction means in contact with said support medium comprises at least 50 percent of the combined surface area of all surfaces of the entire vehicle in contact with said support medium when said airfoil assembly is in its usual upright attitude.

2. The vehicle of claim 1, further including means to house payload; said means fixedly connected to said airfoil assembly; said means selected from the group consisting of fuselages, cabins, cockpits, compartments, and recesses in outer surface of said vehicle.

3. The vehicle of claim 1, wherein one or more airfoils of said airfoil assembly are bent.

4. The vehicle of claim 1 wherein said airfoil assembly comprises the following elements fixedly joined at a central junction point:

a vertical airfoil extending upward from said central junction point;

a port airfoil with a dihedral angle in the range of 0 degrees to −50 degrees, whereby the distal end of said port airfoil is at or below said central junction point;

a starboard airfoil substantially symmetric to said port airfoil.

5. The vehicle of claim 4, having a center of mass at or below said central junction point; whereby the relative wind may be oriented to cause a lift aerodynamic force on said airfoil assembly substantially equal and opposite to the weight of said vehicle; and whereby, when vehicle is thusly airborne, said vehicle has a preferred attitude, and when disturbed from said preferred attitude, said aerodynamic force and weight of said vehicle acting through said center of mass disalign to create a torque to return vehicle to said preferred attitude; and whereby, thusly said vehicle may be stably airborne.

6. The vehicle of claim 1, wherein at least one airfoil has at least one aerodynamic device selected from the group consisting of trailing edge flap, external airfoil flap, trailing edge plain flap, slotted flap trailing edge split flap, double trailing edge split flap, slot, leading edge flap, and leading edge slat;

wherein the combined surface area of said airfoils fixedly joined, of said airfoil assembly, excluding surface area of each said aerodynamic device, comprises at least 70 percent of the combined surface area of all airfoils and each said aerodynamic device of the entire vehicle.

7. The vehicle of claim 6; said vehicle having a longitudinal axis; said vehicle having a plurality of cooperating aerodynamic devices for creating a rolling torque about said longitudinal axis of said vehicle.

8. The vehicle of claim 1, wherein the aerodynamic orientation means comprise elements selected from the group consisting of vertical fins, vertical rudders, horizontal stabilizers with elevators, all-movable horizontal stabilizers, and rudders oriented at an angle between horizontal and vertical.

9. A wind-propelled vehicle capable of travel on water; said vehicle comprising:

an airfoil assembly comprising a plurality of airfoils fixedly joined; said airfoil assembly having substantially a single particular usual upright attitude in relation to said water when said vehicle uses wind for propulsion;

aerodynamic means for orientation of said airfoil assembly, in both yaw and pitch, in relation to a relative wind; the aerodynamic orientation means relying only on the presence of said relative wind; whereby said vehicle may be effectively oriented both when in contact with, and when not in contact with, said water;

a plurality of pontoons such that
(i) each said pontoon is rotatable, relative to said airfoil assembly, about an axis substantially perpendicular to surface of said water when said vehicle is in its usual attitude,
(ii) each said pontoon is elongated about a respective longitudinal axis;
(iii) each said pontoon allows relative motion of said water in directions aligned with its said respective longitudinal axis and resists relative motion of said water in directions not aligned with its said respective longitudinal axis; and
(iv) said pontoons are substantially coplanar, whereby each said pontoon is capable of contacting surface of said water at the same time wherein the combined surface area of said airfoils fixedly joined, of said airfoil assembly, comprises at least 70 percent of the combined surface area of all airfoils of the entire vehicle.

10. The vehicle of claim 9, wherein the orientation of said pontoons may be changed while vehicle is in motion by pilot in command of said vehicle.

11. The vehicle of claim 9, wherein one or more pontoons has one or more hydrofoils attached thereto, each such combination of a pontoon with its attached hydrofoils hereinafter called a pontoon-hydrofoil assembly, whereby the combination of hydrofoils and pontoons control the angle of motion of said vehicle relative to said water.

12. The vehicle of claim 11 further including a first direction and a second direction relative to said vehicle, wherein at least one said pontoon-hydrofoil assembly aligns with said first direction and the remainder of said pontoon-hydrofoil assemblies align with said second direction.

13. The vehicle of claim 11 such that at least one said pontoon-hydrofoil assembly includes:
   an object having two substantially planar surfaces meeting at an edge, hereinafter called a wedge;
   a pivoting support means allowing change of angle of sweepback of said wedge;
   means to control said angle of sweepback of said wedge.

14. A wind-propelled vehicle capable of travel on a support medium; said vehicle comprising:
   an airfoil assembly comprising a plurality of airfoils fixedly joined; said airfoil assembly having substantially a single particular usual upright attitude in relation to said support medium when said vehicle uses wind for propulsion;
   aerodynamic means for orientation of said airfoil assembly in pitch, in relation to a relative wind;
   aerodynamic means for orientation of said airfoil assembly in yaw, in relation to a relative wind; the aerodynamic yaw orientation means comprising one or more rotatable surfaces, each said rotatable surface having a neutral position and rotatable within a range of at least 150 degrees, from −75 degrees to 75 degrees in relation to its said neutral position;
   at least one traction means for controlling direction of movement of said vehicle relative to said support medium; each said traction means allowing motion of said vehicle in a particular direction and its opposite, hereinafter called respectively forward and reverse, and resisting motion of said vehicle in directions not substantially aligned with either said forward or said reverse direction; all said traction means being steerable in unison only, relative to said airfoil assembly, whereby all said traction means have substantially the same forward direction at any given time; said forward direction being adjustable within a range of at least 30 degrees, from 15 degrees port to 15 degrees starboard relative to a neutral position; and said traction means being substantially coplanar, whereby all said traction means are capable of contact with said support medium at the same time;
   a vertical pivot axis passing through the centroid of all surfaces of said traction means in contact with said support medium when airfoil is in its usual upright attitude; said vertical pivot axis being perpendicular to said support medium;
   wherein both the aerodynamic yaw orientation means and the aerodynamic pitch orientation means rely only on the presence of said relative wind; whereby said vehicle may be effectively oriented both when in contact with, and when not in contact with, said support medium;
   wherein, when each said rotatable surface is in its said neutral position, the volume of the solid of revolution generated by revolving collectively said rotatable surfaces of the aerodynamic yaw orientation means completely about said vertical pivot axis, is greater than half the volume of the solid of revolution generated by revolving all fixed airfoil surfaces of said vehicle completely about said vertical pivot axis;
   wherein the combined surface area of said airfoils fixedly joined, of said airfoil assembly, comprises at least 70 percent of the combined surface area of all airfoils of the entire vehicle
   wherein the combined surface area of all said traction means in contact with said support medium comprises at least 50 percent of the combined surface area of all surfaces of the entire vehicle in contact with said support medium when said airfoil assembly is in its usual upright attitude.

15. A wind-propelled vehicle capable of travel on a support medium; said vehicle comprising:
   an airfoil assembly comprising a plurality of airfoils fixedly joined; said airfoil assembly having substantially a single particular usual upright attitude in relation to said support medium when said vehicle uses wind for propulsion; said airfoil assembly comprising one or more airfoils inclined at more than 15 degrees to horizontal when said airfoil assembly is in its said usual upright attitude; the inclined airfoils making up more than 50% of the total area of all airfoils in said airfoil assembly;
   at least one all-moveable airfoil rudder rotatable about an axis substantially perpendicular to said support medium when said vehicle is in said usual upright attitude, whereby yaw of said airfoil assembly in relation to a relative wind may be controlled; each said all-moveable airfoil rudder having a neutral position and rotatable within a range of at least 150 degrees, from −75 degrees to 75 degrees in relation to its said neutral position;
   at least one horizontal stabilizer airfoil with adjustable trailing-edge flap; each said horizontal stabilizer being substantially parallel to said support medium when said vehicle is in said usual upright attitude; whereby pitch of said airfoil assembly in relation to said relative wind may be controlled
   at least one traction means for controlling direction of movement of said vehicle relative to said support medium; each said traction means allowing motion of said vehicle in a particular direction and its opposite, hereinafter called respectively forward and reverse, and resisting motion of said vehicle in directions not substantially aligned with either said forward or said reverse direction; all said traction means being steerable in unison only relative to said airfoil assembly, whereby all said traction means have substantially the same forward direction at any given time; said fraction means being substantially coplanar, whereby all said traction means are capable of contact with said support medium at the same time;
   a vertical pivot axis passing through the centroid of all surfaces of said traction means in contact with said support medium when airfoil is in its usual upright attitude; said vertical pivot axis being perpendicular to said support medium;
   wherein, when each said all-moveable rudder is in its said neutral position, the volume of the solid of revolution generated by revolving collectively the surfaces of each said all-moveable rudder completely about said vertical pivot axis, is greater than half the volume of the solid of revolution generated by revolving all fixed airfoil surfaces of said vehicle completely about said vertical pivot axis;

wherein the combined surface area of said airfoils fixedly joined, of said airfoil assembly, comprises at least 70 percent of the combined surface area of all airfoils of the entire vehicle wherein the combined surface area of all said traction means in contact with said support medium comprises at least 50 percent of the combined surface area of all surfaces of the entire vehicle in contact with said support medium when said airfoil assembly is in its usual upright attitude.

* * * * *